United States Patent [19]

Takano

[11] 4,181,138
[45] Jan. 1, 1980

[54] GOVERNOR VALVE ASSEMBLY FOR AUTOMATIC TRANSMISSION UNITS

[75] Inventor: Toshio Takano, Hino, Japan

[73] Assignee: Fuji Heavy Industries Co., Ltd., Tokyo, Japan

[21] Appl. No.: 854,248

[22] Filed: Nov. 23, 1977

[30] Foreign Application Priority Data

Nov. 30, 1976 [JP] Japan .......................... 51/159315[U]

[51] Int. Cl.² .............................................. G05D 13/36
[52] U.S. Cl. ...................................................... 137/54
[58] Field of Search .................. 74/752 C; 137/56, 54

[56] References Cited

U.S. PATENT DOCUMENTS

| | | | |
|---|---|---|---|
| 2,693,810 | 11/1954 | McFarland | 137/54 X |
| 3,552,409 | 1/1971 | Michnay | 137/54 |
| 3,568,696 | 3/1971 | Kubo | 137/54 |
| 3,683,950 | 8/1972 | Yamada | 137/54 |

Primary Examiner—Robert G. Nilson
Attorney, Agent, or Firm—Birch, Stewart, Kolasch & Birch

[57] ABSTRACT

A governor valve assembly is disclosed for automatic transmission units including first and second valve members which are provided in a rotating governor body so as to be telescopically fitted together. The first and second valve members are arranged on diametrically opposite sides of the rotating axis of the governor body, and cooperate with one another so that when the rotating speed of the governor body reaches a preselected level, a governor pressure is produced and delivered from the assembly.

7 Claims, 3 Drawing Figures

GOVERNOR VALVE ASSEMBLY FOR AUTOMATIC TRANSMISSION UNITS

FIELD OF THE INVENTION

The present invention relates to a governor valve assembly incorporated into the hydraulic control system of an automatic transmission unit used on various motor vehicles.

BACKGROUND OF THE INVENTION

It is well known to use an automatic transmission unit for automatically transmitting an engine power to a driving shaft of a motor vehicle. The automatic transmission unit incorporates therein a torque converter, a transmission device which is controlled depending on the vehicle speed and the position of an accelerator pedal, and a hydraulic control system. The hydraulic control system of the automatic transmission unit employs a governor valve assembly that produces from a line pressure a hydraulic governor pressure varying in accordance with the vehicle speed. The governor valve assembly is provided with a governor shaft driven from an engine via the transmission device of the automatic transmission unit, a governor body fixed to the governor shaft, and a governor valve housed in the governor body so as to move in the direction of the axis of the governor valve. In a typical prior art governor valve assembly, the governor valve is provided with two weights one mounted on each end thereof, so that a particular governor pressure characteristic is acquired according to a change in the vehicle speed. However, the two weights mounted on one end of the governor valve necessarily cause an unbalanced rotation of the governor valve assembly that is quite undesirable from the point of view of the operational life expectancy of the governor assembly. Moreover, the provision of the two weights often causes an unfavorable increase in the size and weight of the governor valve per se.

SUMMARY OF THE INVENTION

A primary object of the present invention is to provide a governor assembly for an automatic transmission unit, having a construction thereof by which the defects of and above-mentioned prior art governor assembly can be obviated.

Another object of the present invention is to provide a governor assembly which is improved in the balance of rotation over the prior art governor assembly.

A further object of the present invention is to provide a governor assembly constructed so that the size of the entire governor valve assembly is considerably decreased compared with the prior art governor valve assembly.

A still further object of the present invention is to provide a governor valve assembly in which a predetermined rotating speed of the governor valve assembly at which the delivery of the governor pressure from the assembly starts, is easily adjusted as required.

A further object of the present invention is to provide a governor valve assembly having therein such a novel construction that a fine valve motion for producing a governor pressure from a line pressure is performed.

Other objects and further scope of applicability of the present invention will become apparent from the detailed description given hereinafter. However, it should be understood, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

These and other objects, features and advantages of the present invention will become more apparent from the ensuing descriptions of an embodiment of the present invention with reference to the accompanying drawings, wherein.

DETAILED DESCRIPTION OF THE INVENTION

Figure 1:
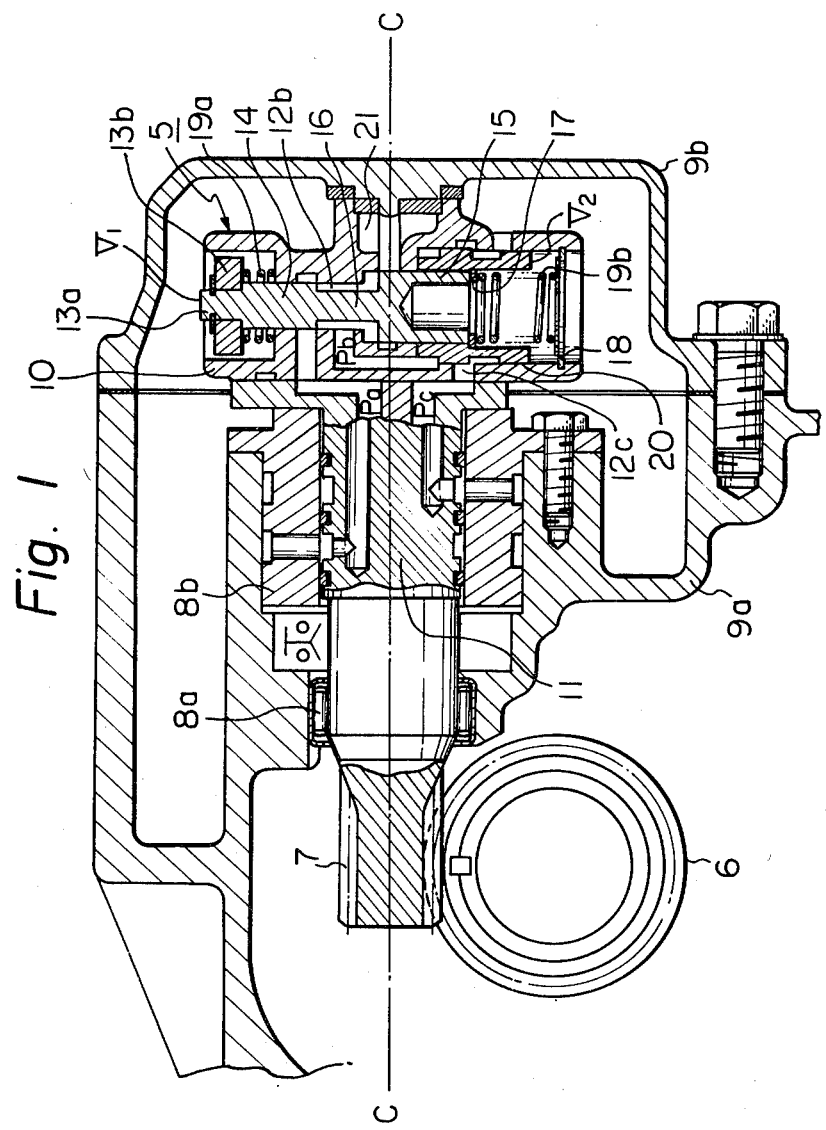
FIG. 1 is a cross-sectional view of an embodiment of a governor valve assembly according to the present invention and its related portion of an automatic transmission unit, illustrating the stationary state of the assembly.
Figure 2:
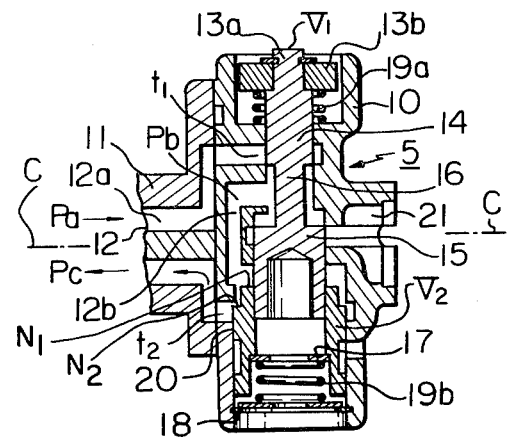
FIG. 2 is a cross-sectional view of the governor valve assembly of FIG. 1, illustrating an operating state of the assembly.

Referring to FIGS. 1 and 2, an entire governor valve assembly 5 is generally encased in a transmission casing 9a and a governor casing 9b bolted to the transmission casing 9a. The governor valve assembly 5 has a governor body 10 fixed to one end of a governor shaft 11 formed at the other end thereof with a governor driven gear 7. The governor driven gear 7 is engaged with a governor drive gear 6 which is rotated by a drive force of a vehicle engine transmitted through a torque converter and a gear mechanism of an automatic transmission unit. Numeral 8a designates a bearing for rotatably supporting the governor shaft 11, and numeral 8b designates a governor sleeve positioned between the transmission casing 9a and the governor shaft 11. The governor body 10 and the governor shaft 11 of the governor valve assembly 5 are formed with a hydraulic fluid passage 12 comprising a first pressure passage 12a for introducing a line pressure fluid into the governor valve assembly 5 through the governor sleeve 8b, a second pressure passage 12b having one end connectable to the first pressure passage 12a, and a third pressure passage 12c connectable to the other end of the second pressure passage 12b, the third pressure passage 12c delivering a governor pressure fluid controlled by the governor valve assembly 5. The governor body 10 has therein first and second governor valve V1 and V2 mounted so as to be slidable within the governor body 10 in the direction perpendicular to the axis of rotation of the governor assembly 5. The first valve V1 includes a cylindrical valve element 13a provided with a weight 13b at the outermost end portion of the element 13a. The outer periphery of the innermost end of the valve element 13a of the first valve V1 is coaxially and slidably fitted in one end of the second valve V2. The center of gravity of the first valve V1 is located away from the axis of rotation C of the governor body 10 toward the outermost end of the valve element 13a, since the weight 13b is mounted on the outermost end of the valve element 13a. On the other hand, the center of gravity of the second valve V2 is located on the opposite side of the axis of rotation C of the governor body 10 with respect to the above-mentioned center of gravity of the first valve V1. The first valve V1 has a medium-diameter land portion 14 positioned adjacent to the weight 13b and a large-diameter land portion 15 spaced apart from the land portion 14 via an intermediate stem portion 16.

The medium-diameter land portion 14 operates so as to change the area of the opening between the first and second pressure passage 12a and 12b as well as to shut said opening in response to the displacement of the first valve V1 in its axial direction within the governor body 10. The above-mentioned opening having a changing area will hereinafter be referred to as "a first variable orifice" and is designated by reference "t1" in FIG. 2. The fluid of the line pressure Pa which is introduced through the first pressure passage 12a, is subjected to pressure reduction during the passing of the pressure fluid through the first variable orifice t1. Then, the pressure fluid enters into the second pressure passage 12b through a space defined around the stem portion 16 of the valve element 13a of the first governor valve V1. Thus, a controlled pressure Pb smaller than the line pressure Pa prevails in the second pressure passage 12b. At this stage, a force corresponding to the product of the controlled pressure Pb and the difference of the area between the end face of the medium-diameter portion 14 acting as a pressure-receiving portion and the end face of the large-diameter portion 15 acts on the first valve V1 in a direction opposite to the direction of the centrifugal force applied to the center of gravity of the first valve V1, so that the two forces are counterbalanced with each other. A spring 19a is positioned between the weight 13b and the governor body 10, and applies an outward spring force to the weight 13b.

The inner end of the second valve V2 is pressed against the governor body 10 by a force of a spring 19b positioned between an inner seat 17 of the second valve V2 and a snap ring 18 fixed to the inner diameter portion of the governor body 10. The second valve V2 consisting of a hollow cylindrical element, has a land portion 20 formed on the periphery thereof. This land portion 20 operates so as to change the area of the opening communicating between the second and third pressure passages 12b and 12c as well as to shut the opening so that the communication between the second and third pressure passages 12b and 12c is intercepted, in response to the displacement of the governor valve V2 in the direction perpendicular to the axis of rotation of the governor body 10. The pressure-receiving shoulder $N_2$ on the inner end of the land portion 20 and the pressure receiving shoulder $N_1$ confront the second pressure passage 12b and the controlled pressure Pb acts on the land portion 20 in a direction compressing the spring 19b. The above-mentioned opening whose area is controlled by the land portion 20 of the second valve V2 will hereinafter be referred to as "second variable orifice t2". The governor body 10 is formed with a drain port 21 at the middle portion thereof. When the line pressure Pa is supplied between the medium-diameter and large-diameter land portions 14 and 15 of the first governor valve V1 through the first variable orifice t1, the first governor valve V1 is instantaneously pushed down by a force caused by the difference of the area between the pressure-receiving faces of the two land portions 14 and 15. As a result, the drain port 21 is opened. Thus, a part of the hydraulic fluid is drained through the opened drain port 21, so that the hydraulic pressure prevailing in the space around the stem of the first governor valve V1 is lowered. When the hydraulic pressure is thus lowered, the first governor valve V1 is upwardly moved to re-open the first variable orifice t1, and the controlled pressure Pb is thus regulated to an appropriate pressure level.

Figure 3:
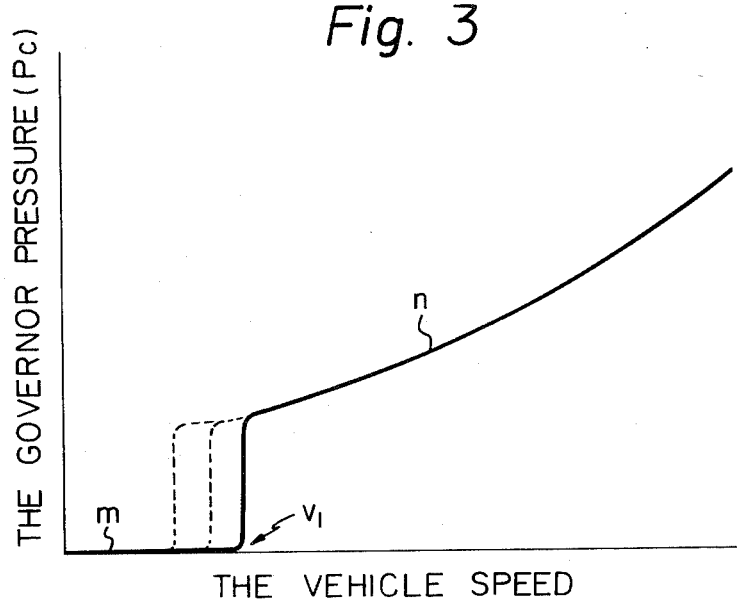
FIG. 3 is a diagram showing a characteristic curve of the hydraulic governor pressure delivered from the governor valve assembly shown in FIGS. 1 and 2.

A description of the operation of the governor valve assembly according to the present invention will now be provided with reference to FIGS. 1, 2 and 3.

The following description is based on the governor valve assembly of the present invention being employed in an automatic transmission unit of a motor vehicle. When the vehicle engine is started, the governor shaft 11 and governor body 10 are rotated about the axis of rotation C. In a low speed region before the vehicle speed reaches a predetermined speed v1 (for example, 15 Km/h), with an increase of the rotating speed of the governor body 10, the centrifugal force acting on the center of gravity of the first valve V1 is increased. As a result, the first valve V1 is displaced in the direction of the centrifugal force whereby the first variable orifice t1 is gradually opened. Accordingly, the line pressure Pa is introduced into the second pressure passage 12b. At this stage, since the second pressure-receiving area of the land portion 15 is larger than the first pressure-receiving area of the land portion 14, the first governor valve V1 is instantaneously pushed down thereby closing the first variable orifice t1. However, as soon as the orifice t1 is closed, the drain port 21 is opened. As a result, hydraulic pressure prevailing in the second pressure passage 12b is lowered. At this instant, the centrifugal force of the first governor valve V1 and the force of the spring 19a become overwhelming, and therefore, the first governor valve V1 is upwardly moved so as to reopen the first variable orifice t1 and close drain port 21 again.

In this way, the hydraulic pressure in the passage 12b, namely the controlled pressure Pb, is produced. The controlled pressure Pb produced simultaneously acts on the pressure-receiving shoulder $N_2$ of the land portion 20 and the pressure-receiving shoulder $N_1$ both on the second governor valve V2. Therefore, the controlled pressure Pb and the centrifugal force acting on the center of gravity of the second governor valve V2 urges the second valve V2 in the outward direction against the force of the spring 19b. However, in the low speed region of the motor vehicle, since the force of the spring 19b is selected so as to overwhelm the resultant force of the above-mentioned centrifugal force and a force produced by the controlled pressure Pb, the second variable orifice t2 is not open, and the delivery of the fluid pressure through the third pressure passage 12c does not take place (region m shown in FIG. 4).

When the vehicle speed exceeds the predetermined level v1 the centrifugal force acting on the first and second governor valves V1 and V2 is increased, and the second valve V2 is moved in the outward direction until the forces imposed on the second valve V2 are counterbalanced with each other. As a result, the second variable orifice t2 appears. Simultaneously, the second and third pressure passages 12b and 12c are communicated with one other so that the hydraulic fluid is permitted to flow from the passage 12b to the passage 12c. Accordingly, a governor pressure Pc is produced in the third pressure passage 12c. The produced governor pressure Pc is applied to one end of a shift valve (not shown) of the hydraulic control system of the automatic transmission unit. It should be noted that the controlled pressure Pb within the passage 12b always acts on the pressure-receiving face shoulder $N_2$ of the land portion 20 and the pressure-receiving shoulder $N_1$ both on the second governor valve V2 so as to urge said second valve V2 in the outward direction. Accordingly, the controlled pressure Pb acting on the land portion 20 and the centrifugal force acting on the center of gravity of the second governor valve V2 are both imposed on the second valve V2. As a result, the resultant force overwhelms the force of the spring 19b, which urges the second valve V2 in the inward direction, thereby opening the second variable orifice t2 through which the governor pressure Pc is delivered. Naturally, an increase in the rotating speed of the governor valve assembly 5 causes an increase in the centrifugal force acting on the center of gravity of the second valve V2. Therefore, in response to the increase in the centrifugal force, the area of the second orifice t2 is increased. As a result, the governor pressure Pc prevailing in the third pressure passage 12c is increased. The region "n" of the curve of FIG. 4 shows a characteristic of the governor pressure Pc.

In the governor valve assembly 5 of the present invention, a speed at which the governor pressure Pc abruptly rises, namely the brake point, can freely be changed as indicated by a dot line in FIG. 4 by merely changing the force of the spring 19b which acts on the second governor valve V2 so to decide a predetermined vehicle speed v1 at which the second variable orifice t2 is opened. Therefore, no cumbersome operation is needed to change the weight 13b, and the size and the volume of the entire assembly can be small. Further, since not only the centrifugal force of the second valve V2 per se but also the controlled pressure Pb which is proportional to the centrifugal force of the first valve V1 is imposed on the second valve, which corresponds to the large weight normally provided for the conventional governor assembly, so as to produce a force acting in the centrifugal direction of the second valve V2 during the rotation of the governor valve assembly, the weight of the second valve V2 is proportionally decreased and the size can be diminished. Therefore, the inertia of the entire governor valve assembly 5 can be reduced so as to protect the rotating system of the governor valve assembly 5. Further, since the center of gravity of the first valve V1 (inclusive of the weight 13b) and the center of gravity of the second valve V2 are located on the sides opposite to each other with respect to the axis of rotation C of the governor body 10, a well-balanced rotation of the entire assembly can be acquired.

From the foregoing description, it will readily be understood that the governor valve assembly of the present invention is very effectively applied to the hydraulic control system of an automatic transmission unit for motor vehicles. However, it should be understood that the governor valve assembly of the present invention can widely be applied to various machines and devices performing a hydraulic shifting operation.

Further, the described embodiment represents a preferred form of the present invention. Accordingly, it should be understood that various modifications will occur to those skilled in the art without departing from spirit of the invention. The scope of the present invention should thus be determined solely by the appended claims.

What is claimed is:

1. A governor valve assembly for a hydraulic control system of an automatic transmission unit for producing a hydraulic governor pressure from a hydraulic line pressure, comprising:

a rotatably supported governor shaft;

a governor body fixed to one end of the governor shaft to be rotated with said governor shaft about an axis of rotation of the governor shaft;

a first valve member slidably fitted in said governor body;

a second valve member slidably fitted in said governor body and arranged to be coaxial and telescopical with said first valve member and including a shoulder portion, said first and second valve members having a center of gravity thereof, respectively, located on the opposite sides of said axis of rotation of said governor shaft;

a first pressure passage formed in said governor body for introducing therein an operating fluid of the hydraulic line pressure;

a second pressure passage formed within said governor body to be fluidly connectable to and disconnectable from said first pressure passage due to a sliding motion of said first valve member in said governor body;

a third pressure passage formed in said governor body to be fluidly connectable to and disconnectable from said second pressure passage due to a sliding motion of said second valve member, said third pressure passage being capable of delivering a controlled fluid of the governor pressure upon being connected to said second pressure passage; and a spring element mounted between said governor body and said second valve for urging said second valve toward said axis of rotation of said governor valve assembly under a preselected spring force;

said first and second pressure passages being fluidly connected to one another by the sliding motion of said first valve in a centrifugal direction thereof, due to the action of a centrifugal force acting on said center of gravity of said first valve during the rotation of said governor assembly, and the fluid connection between said second and third pressure passage being increased by the fluid pressure in said second passage together with the centrifugal force of said fluid in said second passage acting on the shoulder portion of said second valve while said second valve is moved in a centrifugal direction so as to overwhelm said spring force of said spring element.

2. A governor valve assembly as set forth in claim 1, wherein said first valve member is formed with a first pressure-receiving face to receive a pressure of said operating fluid introduced into said second pressure passage which pressure acts so as to urge said first valve member to move away from said axis of rotation of said governor shaft, and a second pressure-receiving face to receive the pressure of said operating fluid which acts to urge said first valve member to move toward said axis of rotation of said governor shaft, said first pressure-receiving face being selected to be smaller than said second pressure-receiving face.

3. A governor valve assembly as set forth in claim 1, wherein said first valve member is provided with a medium-diameter land portion defining said first pressure-receiving face and a large-diameter land portion defining said second pressure-receiving face.

4. A governor valve assembly as set forth in claim 1, wherein said governor body and said first valve member cooperate to define a first variable orifice communicating between said first and second pressure passages, and wherein said governor body and said second valve member cooperate to define a second variable orifice communicating between said second and third pressure passages.

5. A governor valve assembly as set forth in claim 1, further comprising:
a drain port which is formed in said governor body so as to be connectable to said second pressure passage;
a weight provided as a part of said first valve member at an outermost end of said first valve member located away from said axis of rotation of said governor shaft, and;
a second spring element located between said governor body and said weight, said second spring element operating to position said first valve member at a predetermined position to close said drain port, said drain port being opened when said pressure of said operating fluid in said second pressure passage exceeds a predetermined pressure level capable of overwhelming a spring force of said another spring element.

6. A governor valve assembly as set forth in claim 1, wherein said governor shaft is formed, at the other end thereof, with a gear teeth engagable with a governor drive gear provided for said automatic transmission unit.

7. A governor valve assembly for a hydraulic control system of an automatic transmission unit for producing a hydraulic governor pressure from a hydraulic line pressure, comprising:
a rotatably supported governor shaft;
a governor body fixed to one end of the governor shaft to be rotated with said governor shaft about an axis of rotation of the governor shaft;
a first valve member slidably positioned in said governor body;
a second valve member slidably positioned in said governor body and arranged to be coaxial and telescopical disposed around said first valve member and including a shoulder portions said first and second valve members having a center of gravity thereof, respectively, located on the opposite sides of said axis of rotation of said governor and said second valve member being displaced outwardly from said axis of rotation of said governor shaft;
a first pressure passage formed in said governor body for introducing therein an operating fluid of the hydraulic line pressure;
a second pressure passage formed within said governor body to be fluidly connectable to and disconnectable from said first pressure passage due to a sliding motion of said first valve member in said governor body;
a drain port in said governor body being connectable to said second pressure passage by the sliding motion of said first valve to produce a controlled governor pressure in said second pressure passage;
a third pressure passage formed in said governor body to be fluidly connectable to and disconnectable from said second pressure passage due to a sliding motion of said second valve member, said third pressure passage being capable of delivering a controlled fluid of the governor pressure upon being connected to said second pressure passage; and
a spring element mounted between said governor body and said second valve for urging said second valve toward said axis of rotation of said governor valve assembly under a preselected spring force;
said first and second pressure passages being fluidly connected to one another by the sliding motion of said first valve in a centrifugal direction thereof, due to the action of a centrifugal force acting on said center of gravity of said first valve during the rotation of said governor assembly, and the fluid connection between said second and third pressure passages being increased by the fluid pressure in said second passage acting on the shoulder portion of said second valve together with the action of a centrifugal force acting on said center of gravity of said second valve during the rotation of said governor assembly, to move said second valve in a centrifugal direction so as to overwhelm said spring force of said spring element.

* * * * *